A. R. WYLIE & J. G. WRIGHT.
AUTOMOBILE WHEEL.
APPLICATION FILED OCT. 11, 1909.
1,018,467.
Patented Feb. 27, 1912.
2 SHEETS—SHEET 2.
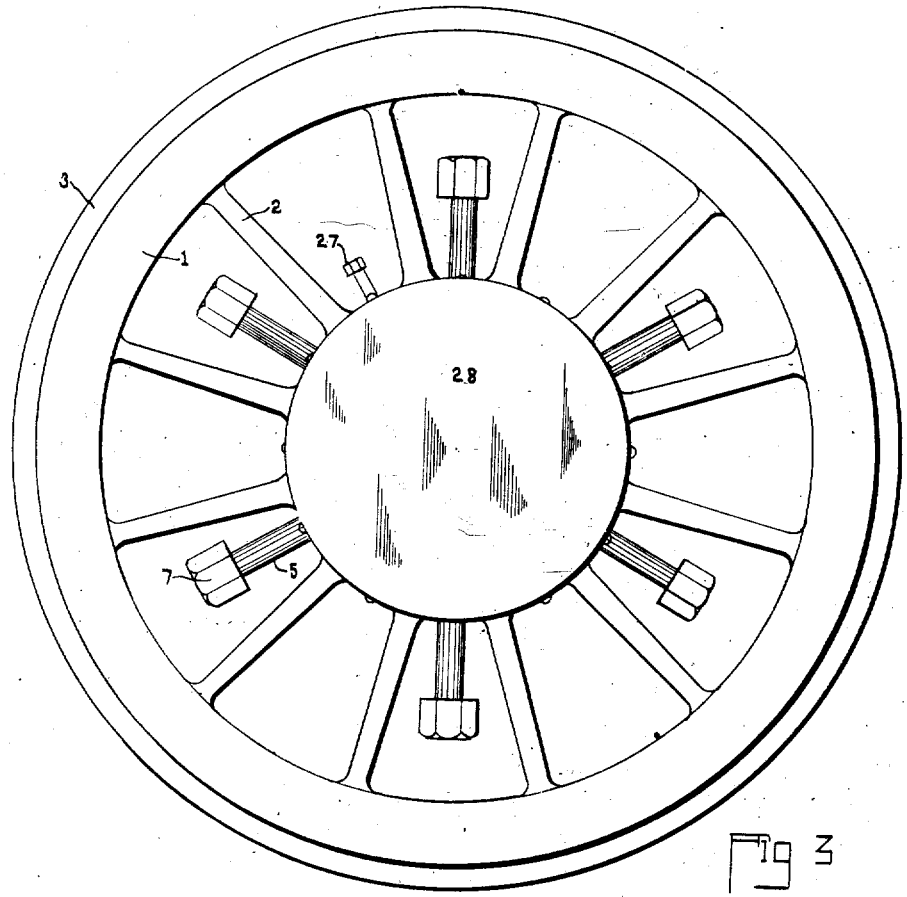
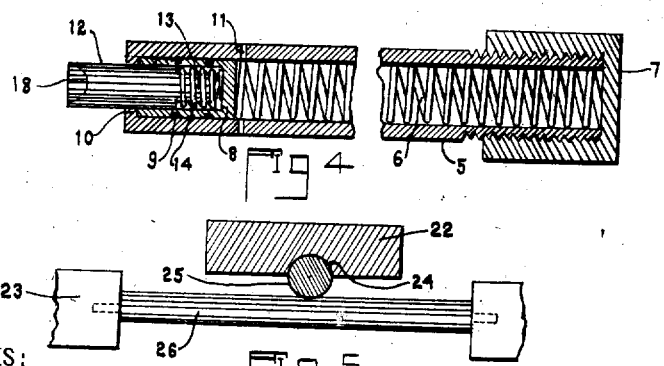
WITNESSES:
C D Scott
J. S. Murray
INVENTORS
Alfred R. Wylie
James G. Wright
BY John M. Spellman
ATTORNEY

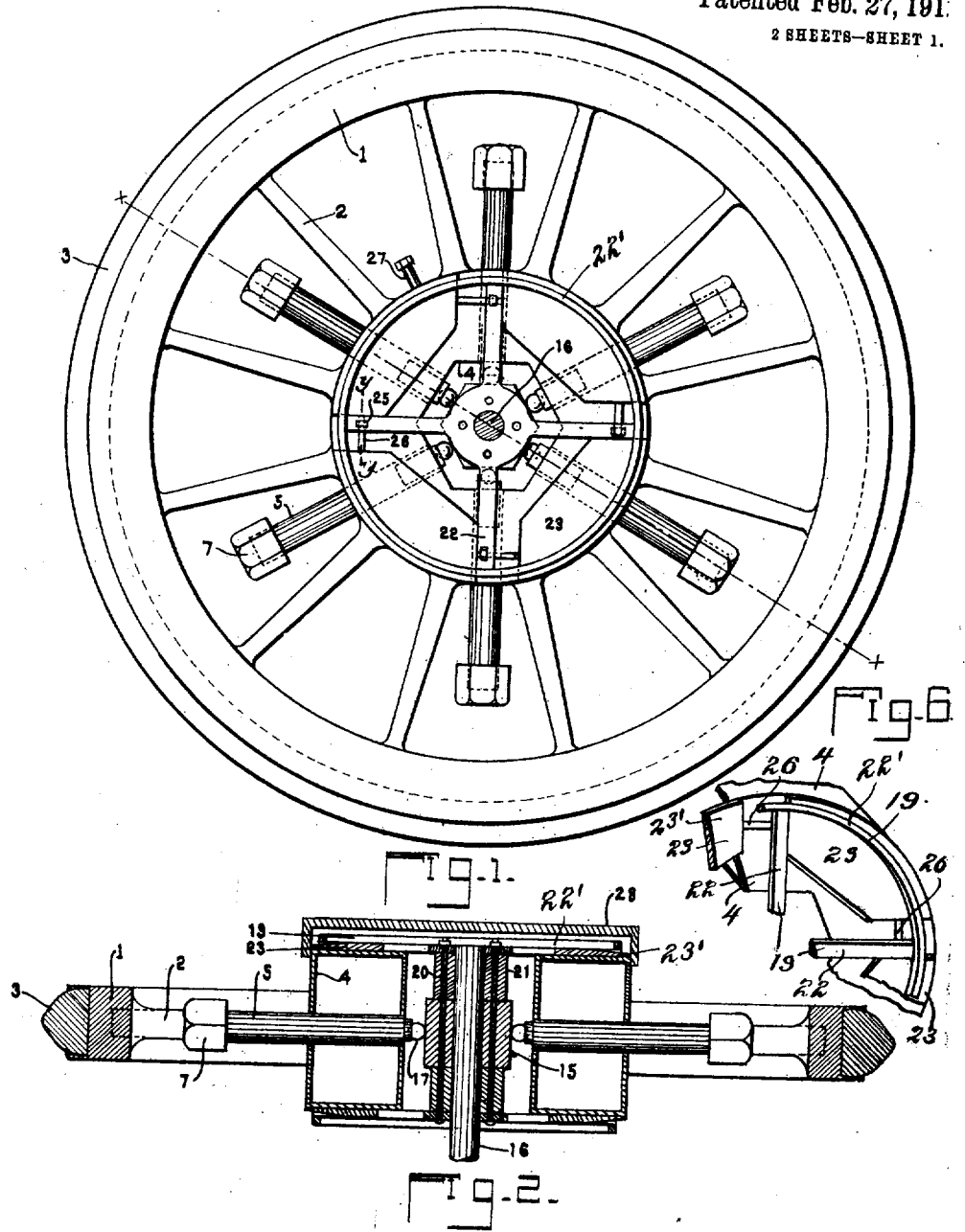

UNITED STATES PATENT OFFICE.

ALFRED R. WYLIE AND JAMES G. WRIGHT, OF BIG SPRING, TEXAS.

AUTOMOBILE-WHEEL.

1,018,467. Specification of Letters Patent. Patented Feb. 27, 1912.

Application filed October 11, 1909. Serial No. 522,121.

*To all whom it may concern:*

Be it known that we, ALFRED R. WYLIE and JAMES G. WRIGHT, citizens of the United States, residing at Big Spring, in the county of Howard and State of Texas, have invented certain new and useful Improvements in Automobile-Wheels, of which the following is a specification.

Our invention relates to new and useful improvements in automobile wheels. Its object is to provide a substitute for an automobile wheel equipped with the pneumatic tire, of cheaper and more lasting construction than such a tire.

Another object is to provide an automobile wheel, the resiliency of which will be at the hub of the wheel instead of at the rim as in the present practice.

A further object is to provide a wheel which will combine a plurality of coiled springs with an air cushion to take up the shocks and jars received by the wheel.

Finally the object of the invention is to provide a device of the character described that will be strong, durable, simple and efficient, and comparatively easy to produce.

With these and various other objects in view our invention has relation to certain novel features of construction and operation, an example of which is described in the following specification, and illustrated in the accompanying drawings, wherein:

Figure 1 is a side elevation of the improved automobile wheel. Fig. 2 is a cross section of the same taken on the line $x$—$x$ of Fig. 1. Fig. 3 is a side elevation of the wheel with a dust cap positioned upon the hub. Fig. 4 is a detail of one of the airtight cylinders, which project radially from the hub, and contain plungers acted upon both by coiled springs and by compressed air to take up shocks received at the rim of the wheel. Fig. 5 is detail sectional view on the line $y$—$y$ of Fig. 1, showing a pair of contiguous rollers which are positioned at various points about the hub to lessen the friction of wheel and hub. Fig. 6 is a detail sectional perspective view showing the relation of the spider and the projections with one another, and with the hub of the wheel.

Referring now more particularly to the drawings, wherein like numerals of reference designate similar parts in all the figures, the numeral 1 denotes the rim of the wheel and 2 the spokes thereof. A tire 3 of solid rubber is mounted upon the rim to form a tread. The hub 4 to which the inner ends of the spokes attach is hollow, the preferable construction being a metallic shell. The inner surface of this hub, which faces the axle is hexagonal. A plurality of cylinders 5 are rigidly mounted in the hub, with their outer extremities projecting radially therefrom and their inner extremities terminating one at each of the inner hexagonal faces of the hub. Within each cylinder, a coiled spring 6 is positioned, one end of which abuts against a cap 7 threaded upon the outer end of the cylinder, while the other end bears upon a hollow plunger 8 slidably mounted in the cylinder. The cap 7 is sufficiently long to permit the spring to project from the cylinder when the cap is first applied, the threading on of the cap serving to compress the spring. A pair of packing rings 9 are set into the plunger 8, serving to make an air tight fit between plunger and cylinder. The inner extremities of the cylinders are provided each with an inwardly projecting flange 10 to eliminate possibility of the plunger being inwardly displaced from the cylinder under the action of the spring 6. Air ports 11 open into each cylinder from the hub, and are so positioned that they will be closed by the plunger 8, when the same is displaced into the cylinder. Within each of the hollow plungers 8, there is positioned a solid plunger 12 which projects from the cylinder, and has a reduced neck portion 13, about which is coiled a spring 14. The springs 14 tend to actuate their respective plungers 12 toward the center of the hub, causing them to constantly exert pressure upon a hexagonal collar 15 fast upon the shaft 16 of the vehicle. This pressure is transmitted by balls 17 set in suitable depressions 18 upon the ends of the plungers 8. At each side of the hub a spider 19 is mounted upon the shaft 16. These spiders are rigidly connected by bolts 20 to the hexagonal collar 15, each spider being provided with a hub 21 bearing against said collar and holding it in its proper position. The spiders are contiguous with the sides of the hub and between their arms 22 are projections 23 secured to the hub, and designed to be encountered by said arms when rotation is applied to the axle, causing such rotation to be communicated to the wheel. These arms 22 are connected by a circular member 22' and the projections 23 are beveled as at 23' to prevent said circular member from contacting the same thereby eliminating all possible friction. These spiders 19 in conjunction with the projections 23, serve also to hold the wheel in the same position relative to the axle, so that each plunger will bear constantly upon the same face of the hexagonal collar.

Each of the arms 22 is provided upon its under surface with a semi-cylindrical groove 24, extending longitudinally of the spoke, and receiving a roller 25. This roller is contiguous with a transverse roller 26 the extremities of which are rotatably mounted in the projections 23. These rollers 25 and 26 turn one upon the other and reduce the friction due to the constant transverse shifting of the wheel relative to the shaft when in use. A valve 27 of ordinary construction is provided to the hollow hub to permit air to be compressed therein and a sand cap 28 is attached to the hub to protect the interior thereof from dirt and dust. It is apparent that when this wheel is employed on an automobile, a shock or jar imparted to the rim by any obstruction or inequality in the path of the wheel, will produce an upward displacement of the wheel relative to the shaft, and a consequent compression of the air and springs in the lower cylinders. The shock will exhaust itself in the compression of the air and springs without communicating a corresponding shock to the axle upon which the wheel is mounted.

The pressure of air within the hollow hub should obviously be proportionate to the load to be supported by the wheel, and the strength of springs employed will also depend mainly upon the load.

We are aware that changes may be made in the form and proportion of parts and details of the device herein described as the preferable embodiment of our invention without departing from the spirit or sacrificing the advantages thereof, and we therefore reserve the right to make such changes and alterations in said device as fairly come within the scope of the following claim.

What we claim is:

In an automobile wheel, the combination with the rim and spokes, thereof, of a hollow hub rigid with the inner extremities of the spokes, and adapted to contain compressed air, a plurality of air tight cylinders rigid with said hub and extending radially therethrough, valve openings being provided into each cylinder from the hub interior, a hollow plunger mounted in each cylinder, a spring coiled in each cylinder, actuating the plunger toward the wheel center, a plunger slidable within each hollow plunger, a spring actuating said inner plunger toward the wheel center, an axle adapted to communicate rotation to the wheel, a collar rigidly mounted upon said axle, against which the inner extremities of the inner plungers tend to bear, rotatable means interposed between each plunger and said collar, spiders mounted upon said shaft at each side of the hub adapted to turn with the shaft, projections upon the hub adapted to be engaged by said spiders in their rotation and rotatable means for lessening the friction between the sides of the hubs and the sides of said spiders.

In testimony whereof we have signed our names to this specification in the presence of two subscribing witnesses.

ALFRED R. WYLIE.
JAMES G. WRIGHT.

Witnesses:
J. I. PRICHARD,
W. R. PURSER.